(12) United States Patent
Yoshimitsu et al.

(10) Patent No.: US 7,391,604 B2
(45) Date of Patent: Jun. 24, 2008

(54) SOLID ELECTROLYTIC CAPACITOR

(75) Inventors: Satoru Yoshimitsu, Saga (JP);
Kazumasa Fujimoto, Saga (JP);
Hiromu Saito, Hamura (JP); Yasushi Yoshida, Fussa (JP)

(73) Assignees: Sanyo Electric Co., Ltd., Moriguchi-shi (JP); Saga Sanyo Industries Co., Ltd., Kishima-gun (JP); Japan Capacitor Industrial Co., Ltd., Tokyo (JP)

( * ) Notice: Subject to any disclaimer, the term of this patent is extended or adjusted under 35 U.S.C. 154(b) by 135 days.

(21) Appl. No.: 10/546,209

(22) PCT Filed: Feb. 16, 2004

(86) PCT No.: PCT/JP2004/001656

§ 371 (c)(1),
(2), (4) Date: Aug. 18, 2005

(87) PCT Pub. No.: WO2004/077465

PCT Pub. Date: Sep. 10, 2004

(65) Prior Publication Data

US 2006/0146474 A1 Jul. 6, 2006

(30) Foreign Application Priority Data

Feb. 25, 2003 (JP) ............................. 2003-046958

(51) Int. Cl.
*H01G 9/00* (2006.01)

(52) U.S. Cl. .................. 361/523; 361/516; 361/519; 361/525; 361/528; 361/529; 29/25.01; 29/25.03

(58) Field of Classification Search ........... 361/52–534; 29/25.03, 25.01
See application file for complete search history.

(56) References Cited

U.S. PATENT DOCUMENTS

| 5,694,287 | A  | * | 12/1997 | Nishiyama et al. | 361/525 |
| 6,134,099 | A  | * | 10/2000 | Igaki et al. | 361/509 |
| 6,519,137 | B1 | * | 2/2003 | Nitta et al. | 361/525 |
| 6,529,367 | B1 |   | 3/2003 | Naito et al. |  |
| 6,853,540 | B2 | * | 2/2005 | Kudoh et al. | 361/523 |
| 7,167,356 | B2 | * | 1/2007 | Fujimoto | 361/523 |

FOREIGN PATENT DOCUMENTS

| JP | 05-009790 | 1/1993 |
| JP | 2000-012402 | 1/2000 |
| JP | 2000-182899 | 6/2000 |
| JP | 2002-299181 | 10/2002 |
| JP | 2003-022934 | 1/2003 |

OTHER PUBLICATIONS

Japanese Office Action mailed Sep. 25, 2007 with English translation (4 pages).

* cited by examiner

*Primary Examiner*—Nguyen T. Ha
(74) *Attorney, Agent, or Firm*—Kratz, Quintos & Hanson, LLP

(57) ABSTRACT

A solid electrolytic capacitor having a capacitor element which includes an anode foil and a cathode foil rolled with a separator interposed therebetween, and a solid electrolyte layer or an electrically conductive polymer layer provided therein. The anode foil is coated with a dielectric oxide film. The dielectric oxide film is an oxide film formed by oxidizing a film of a mono-metal nitride or a composite metal nitride formed on the anode foil. The mono-metal nitride is titanium nitride, zirconium nitride, tantalum nitride or niobium nitride. The composite metal nitride is aluminum titanium nitride, chromium titanium nitride, zirconium titanium nitride or titanium carbonitride.

5 Claims, 1 Drawing Sheet

SOLID ELECTROLYTIC CAPACITOR

TECHNICAL FIELD

The present invention relates to a solid electrolytic capacitor which includes an anode foil and a cathode foil rolled together.

BACKGROUND ART

FIG. 2 is a sectional front view of a prior art solid electrolytic capacitor 1, and FIG. 1 is a perspective view of a prior art capacitor element 2 (see, for example, Japanese Examined Patent Publication No. HEI4-19695 (1992)).

The solid electrolytic capacitor 1 includes an aluminum case 3 having a top opening, the capacitor element 2 contained in the case 3, and a rubber packing 30 which seals the opening of the case 3. An upper edge portion of the case 3 is curved to fix the packing 30, and a plastic seat plate 31 is attached to the top of the case 3. Lead wires 21, 21 extend from the capacitor element 2 through the packing 30 and the seat plate 31, and then bent laterally.

As shown in FIG. 1, the capacitor element 2 includes an anode foil 4 of an aluminum foil coated with a dielectric oxide film and a cathode foil 5 of an aluminum foil, which are rolled together into a roll with a separator 6 of an insulative material such as paper interposed therebetween and fixed by a tape 26. The roll is impregnated with a solid electrolyte such as a TCNQ (7,7,8,8-tetracyanoquinodimethane) complex salt, or includes an electrically conductive polymer layer provided therein. Lead tabs 25, 25 respectively extend from the anode foil 4 and the cathode foil 5, and the lead wires 21, 21 respectively extend from the lead tabs 25, 25.

Where the electrically conductive polymer layer is to be formed between the foils 4 and 5, the capacitor element 2 is impregnated with a mixture solution containing ethyl alcohol as a diluent, 3,4-ethylenedioxythiophene and iron(III) p-toluenesulfonate, followed by thermal polymerization.

Although the solid electrolytic capacitor 1 having such a construction is widely used, there is a market demand for a capacitor having a smaller size and a greater capacitance. To this end, a capacitor has been proposed whose cathode foil 5 is coated with a metal nitride film (see, for example, Japanese Unexamined Patent Publication No. 2000-114108).

In general, the dielectric oxide film is not intentionally formed on the cathode foil 5, but formed by natural oxidation. Therefore, the capacitance C of the capacitor is equivalent to a capacitance obtained by connecting the capacitance Ca of the anode foil 4 and the capacitance Cc of the cathode foil 5 in series, and represented by the following equation:

$C = Ca \times Cc/(Ca+Cc) = Ca \times 1/(Ca/Cc+1)$

That is, if the cathode foil 5 has the capacitance Cc, the capacitance C of the capacitor is smaller than the capacitance Ca of the anode foil 4. Therefore, a film of a metal nitride such as TiN is formed on the cathode foil 5 by sputtering or vapor deposition, and electrically connected to an aluminum base of the cathode foil 5. Thus, the capacitance of the capacitor can be increased without size increase of the capacitor because the cathode foil 5 has no capacitance. However, the inventor has found that the cathode foil 5 having such a structure is less effective for increasing the capacitance of the solid electrolytic capacitor 1.

Further, it has been proposed that the capacitance Ca of the anode foil 4 is increased by increasing the dielectric constant of the anode foil 4 (see, for example, Japanese Unexamined Patent Publication No. HEI5-121275 (1993)). For preparation of the anode foil 4 having an increased dielectric constant, a surface of a titanium anode base is oxidized in a solution containing an electrolyte thereby to be formed with a dielectric film of titanium oxide. Titanium oxide has a relative dielectric constant of about 100 (no unit), which is higher than that of aluminum oxide. Since the capacitance is proportional to the relative dielectric constant, the capacitance of the anode foil can be increased.

However, the dielectric film formed by the direct oxidization of the surface of the titanium base is liable to be aged over time. That is, it is difficult to form a stable titanium oxide film on the surface of the titanium anode base. Further, a voltage of 10V to 20V at the lowest is required to be applied for the formation of the titanium oxide film on the surface of the titanium base as described in Japanese Unexamined Patent Publication No. HEI5-121275. A voltage permitted to be applied is about triple the rated voltage of the solid electrolytic capacitor 1 to be produced. The inventor has experimentally confirmed that, if the anode is to be coated with titanium oxide, the solid electrolytic capacitor 1 should have a rated voltage of not lower than 6.3V and, therefore, it is impossible to form a titanium oxide film on an anode of a solid electrolytic capacitor having a lower rated voltage on the order of 2V to 3V.

DISCLOSURE OF THE INVENTION

It is therefore an object of the present invention to provide a solid electrolytic capacitor which includes an anode having a greater capacitance and, particularly, to provide a solid electrolytic capacitor having a lower rated voltage.

A solid electrolytic capacitor 1 comprises a capacitor element 2 which includes an anode foil 4 and a cathode foil 5 rolled with a separator 6 interposed therebetween, and a solid electrolyte layer or an electrically conductive polymer layer provided therein, wherein the anode foil 4 is coated with a dielectric oxide film.

The dielectric oxide film is an oxide film formed by oxidizing a film of a mono-metal nitride or a composite metal nitride formed on the anode foil 4.

The mono-metal nitride is a valve metal nitride selected from the group consisting of titanium nitride, zirconium nitride, tantalum nitride and niobium nitride. The composite metal nitride is selected from the group consisting of aluminum titanium nitride, chromium titanium nitride, zirconium titanium nitride and titanium carbonitride.

BEST MODE FOR CARRYING OUT THE INVENTION

One embodiment of the present invention will hereinafter be described in detail with reference to the attached drawings.

Figure 1:
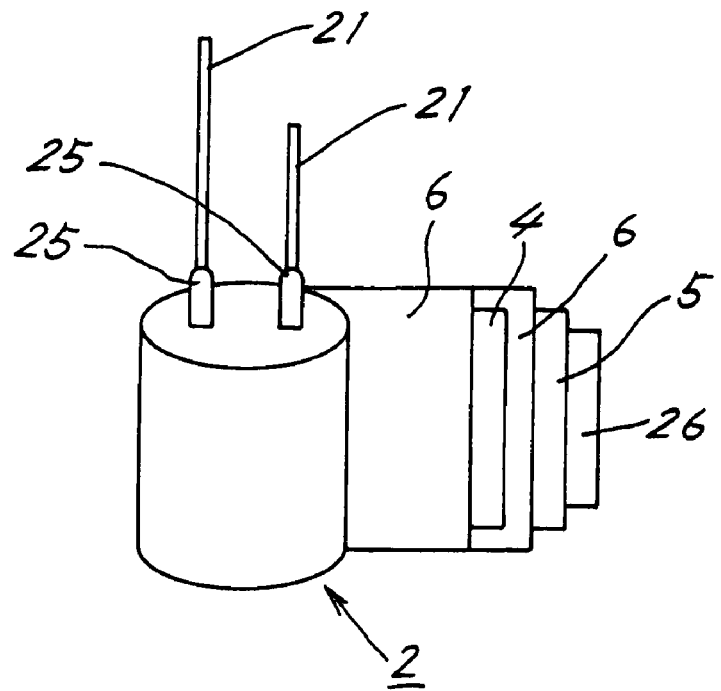
FIG. 1 is a perspective view of a prior art capacitor element.
Figure 2:
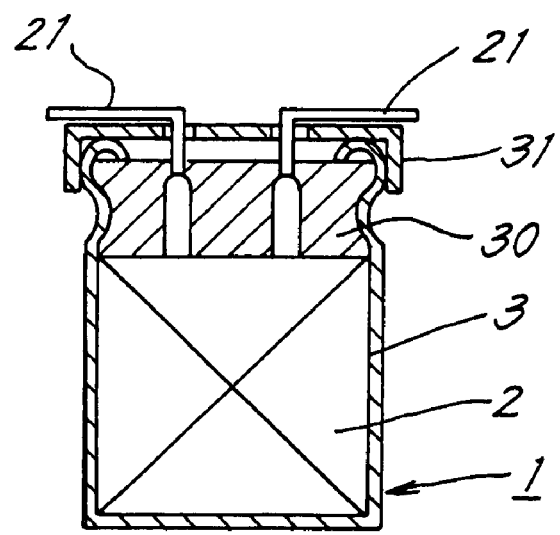
FIG. 2 is a sectional front view of a prior art solid electrolytic capacitor.

A solid electrolytic capacitor 1 has substantially the same overall construction as the prior art capacitor shown in FIG. 2. As shown in FIG. 1, a capacitor element 2 includes an anode foil 4 of an aluminum foil having an electrochemically formed film and a cathode foil 5 of an aluminum foil, which are rolled together into a roll with an insulative separator 6 interposed therebetween and fixed by a tape 26. The capacitor element 2 is impregnated with a solid electrolyte such as a TCNQ complex salt, or includes an electrically conductive polymer layer provided therein. A pair of lead wires 21, 21 extend from the capacitor element 2.

The capacitor element 2 is produced in the following manner. First, an aluminum foil strip for the anode foil 4 is cut out of an aluminum sheet, and etched. The surface of the aluminum foil is roughened by the etching, whereby the surface area of the aluminum foil is increased to increase the capacitance of the anode foil. Then, a titanium nitride (TiN) film is formed on the aluminum foil by vapor deposition. Instead of the vapor deposition, ion plating, sputtering, thermal CVD, plasma CVD, photo CVD or laser CVD may be employed for the formation of the titanium nitride film.

Then, the aluminum foil formed with the titanium nitride film is immersed in a chemical agent, and a voltage of about 5V is applied to the aluminum foil. Thus, the titanium nitride film is oxidized for formation of a dielectric oxide film. The resulting aluminum foil is employed as the anode foil 4. The dielectric oxide film is composed of titanium oxide. Known examples of the chemical agent include solutions of a phosphate, a borate and an adipate. Solutions of other acidic slats may be employed as the chemical agent.

On the other hand, the cathode foil 5 is prepared by forming a titanium nitride (TiN) film on an aluminum foil by vapor deposition.

The anode foil 4 and the cathode foil 5 are rolled together into a roll with an insulative separator 6 interposed therebetween and fixed by a tape 26 for production of the capacitor element 2. Since the anode foil 4 is prepared by cutting the aluminum sheet as described above, end faces of the anode foil 4 are formed with no dielectric oxide film. Therefore, the capacitor element 2 is subjected to an electrochemical process to form dielectric oxide films on the end faces of the anode foil 4. Thereafter, the capacitor element 2 is thermally treated at 280° C. for stabilization of the characteristic properties of the dielectric oxide films.

In turn, the capacitor element 2 is impregnated with a mixture solution containing ethyl alcohol as a diluent, 3,4-ethylenedioxythiophene and iron(II) p-toluenesulfonate, followed by thermal polymerization. Thus, an electrically conductive polymer layer is formed between the foils 4 and 5, whereby the capacitor element 2 is completed. Iron(II) p-toluenesulfonate is contained in ethyl alcohol in a concentration of 40 wt % to 60 wt % which is suitable for imparting the mixture solution with a practical viscosity in a capacitor production process. As in the prior art, the capacitor element 2 is sealed in a case 3, whereby the solid electrolytic capacitor 1 is completed.

In this embodiment, the electrically conductive polymer layer is formed of an electrically conductive polythiophene polymer, but may be formed of a polypyrrole or polyaniline functional polymer. Instead of the electrically conductive polymer layer, a solid electrolyte layer such as of a TCNQ complex salt may be formed.

Titanium oxide has a relative dielectric constant of about 100, which is higher than that of aluminum oxide (about 10). Therefore, the capacitance of the anode foil 4 and hence the capacitance of the solid electrolytic capacitor 1 can be increased. Further, the dielectric oxide film of titanium oxide formed by oxidizing the mono-metal nitride or the composite metal nitride has more stable characteristic properties than a dielectric oxide film formed by direct oxidation of titanium.

Since defects present in the dielectric oxide film are covered with nitrogen molecules, increase in leak current can be prevented, and the capacitance of the capacitor can be increased. Further, a voltage required to be applied for the oxidation of the composite metal nitride film for the formation of the oxide film is merely about 5V. A voltage permitted to be applied for the formation of the oxide film is about triple the rated voltage of the solid electrolytic capacitor 1 to be produced. Therefore, even if the solid electrolytic capacitor 1 has a lower rated voltage, it is possible to form the titanium oxide film on the anode foil 4 of the capacitor 1.

The inventor of the present invention produced a solid electrolytic capacitor 1 of Example 1 in the same manner as described above by employing an anode foil 4 coated with an oxide film formed by oxidation of titanium nitride (TiN, mono-metal nitride). The inventor also produced a solid electrolytic capacitor 1 of Example 2 by employing an anode foil 4 coated with an oxide film formed by oxidation of aluminum titanium nitride (TiAlN, composite metal nitride). Further, the inventor produced a solid electrolytic capacitor 1 of Prior Art Example by the prior art method, i.e., by employing an anode foil 5 prepared by forming an oxide film on an aluminum foil and a cathode foil 5 prepared by forming a titanium nitride (TiN) film on an aluminum foil.

The solid electrolytic capacitors 1 thus produced each had a rated voltage of 2.5V and a capacitance of 390 μF, and cases 3 of the capacitors each had an outer diameter of 6.3 mm and a height of 6.0 mm.

The capacitances ("Cap" in units of μF) of the capacitors of Examples 1 and 2 and Prior Art Example were measured at a frequency of 120 Hz. The equivalent series resistances ("ESR" in units of mΩ) of the capacitors were measured at a frequency of 100 kHz. The leak currents ("LC" in units of μA) of the capacitors were measured after a lapse of 2 minutes from application of a rated DC voltage. The results of the measurement are shown in Table 1. The electrical characteristic values are each calculated as an average of measured values for 20 samples.

TABLE 1

|  | Cap (μF) | ESR (mΩ) | LC (μA) |
| --- | --- | --- | --- |
| Prior Art Example | 371 | 10.6 | 36 |
| Example 1 | 560 | 9.6 | 0.8 |
| Example 2 | 583 | 9.2 | 0.9 |

Comparison of the measurement results shows that the increase of the capacitance and the reduction of the equivalent series resistance and the leak current can be achieved by employing the anode foil 4 coated with the dielectric oxide film formed by the oxidation of titanium nitride (TiN, mono-metal nitride) or aluminum titanium nitride (TiAlN, composite metal nitride).

Although titanium nitride (TiN) was employed as the mono-metal nitride in Example 1, substantially the same results are supposedly provided even if zirconium nitride (ZrN), tantalum nitride (TaN) or niobium nitride (NbN) is employed instead of titanium nitride. That is, a valve metal may be employed as the mono-metal. The valve metal herein means a metal naturally uniformly coated with its oxide.

Although aluminum titanium nitride (TiAlN) was employed as the composite metal nitride in Example 2, substantially the same results are supposedly provided even if chromium titanium nitride (TiCrN), zirconium titanium nitride (TiZrN) or titanium carbonitride (TiCN) is employed as the composite metal nitride. That is, a nitride of titanium and a valve metal may be employed as the composite metal nitride.

In the embodiment described above, the aluminum foil for the anode foil 4 is not necessarily required to be subjected to the etching process. Further, the anode foil 4 and the cathode foil 5 are formed from the aluminum foil, but may be formed from a valve metal foil. The top opening of the case 3 may be closed by an epoxy resin. Further, the capacitor may be configured in a radial lead form.

INDUSTRIAL APPLICABILITY

The dielectric oxide film formed on the anode foil 4 is a film formed by oxidizing a mono-metal nitride or a composite metal nitride, more specifically, a titanium oxide film. Since the dielectric oxide film has a higher relative dielectric constant, the capacitance of the anode foil 4 and hence the capacitance of the solid electrolytic capacitor 1 can be increased. Further, the dielectric oxide film of titanium oxide formed by the oxidation of the mono-metal nitride or the composite metal nitride has more stable characteristic properties than the dielectric oxide film formed by the direct oxidation of titanium.

Since the defects present in the dielectric oxide film are covered with nitrogen molecules, the increase in leak current can be prevented. Thus, the capacitance of the capacitor can be increased. Further, the voltage required to be applied for the oxidation of the composite metal nitride for the formation of the oxide film is merely about 5V. Therefore, even if the solid electrolytic capacitor 1 has a lower rated voltage on the order of 2V to 3V, it is possible to form the titanium oxide film on the anode film 4 of the capacitor 1.

What is claimed is:

1. A solid electrolytic capacitor comprising a capacitor element which includes an anode foil and a cathode foil rolled with a separator interposed therebetween, and a layer of a solid electrolyte or an electrically conductive polymer provided therein, wherein the anode foil is coated with a dielectric oxide film, wherein the dielectric oxide film is an oxide film formed by oxidizing the film of a mono-metal nitride or a composite metal nitride formed on the anode foil.

2. A solid electrolytic capacitor as set forth in claim 1, wherein the mono-metal nitride is a valve metal nitride selected from the group consisting of titanium nitride, zirconium nitride, tantalum nitride and niobium nitride.

3. A solid electrolytic capacitor as set forth in claim 1, wherein the composite metal nitride is selected from the group consisting of aluminum titanium nitride, chromium titanium nitride, zirconium titanium nitride and titanium carbonitride.

4. A solid electrolytic capacitor as set forth in claim 1, wherein the electrolyte in the capacitor element is an electrically conductive polythiophene polymer.

5. A solid electrolytic capacitor as set forth in claim 1, wherein the anode foil and the cathode foil each comprise a foil of a valve metal.

* * * * *